A. W. TESCH.
RESILIENT WHEEL.
APPLICATION FILED FEB. 2, 1920.
1,352,769. Patented Sept. 14, 1920.
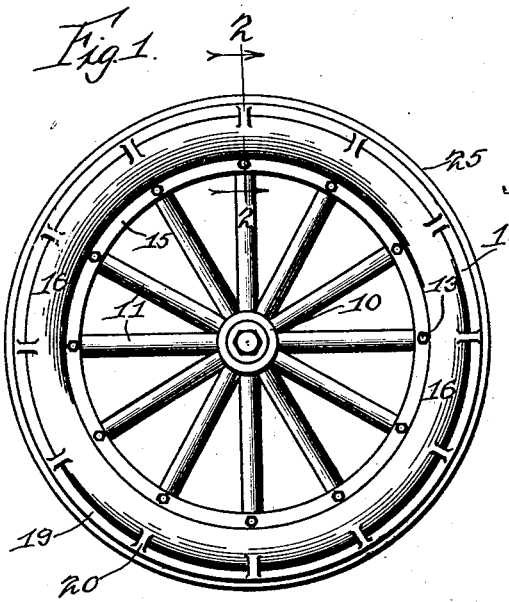
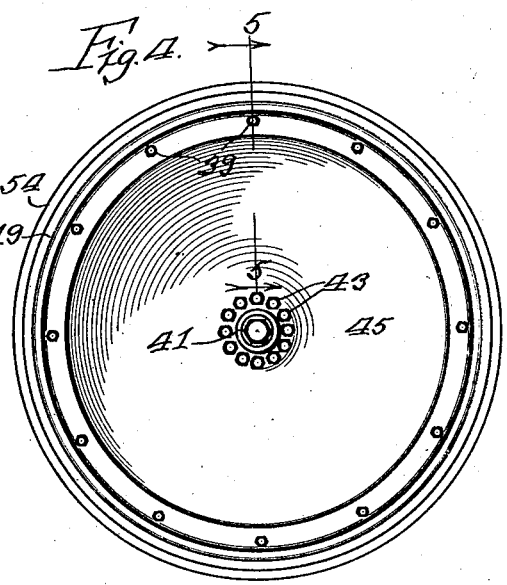
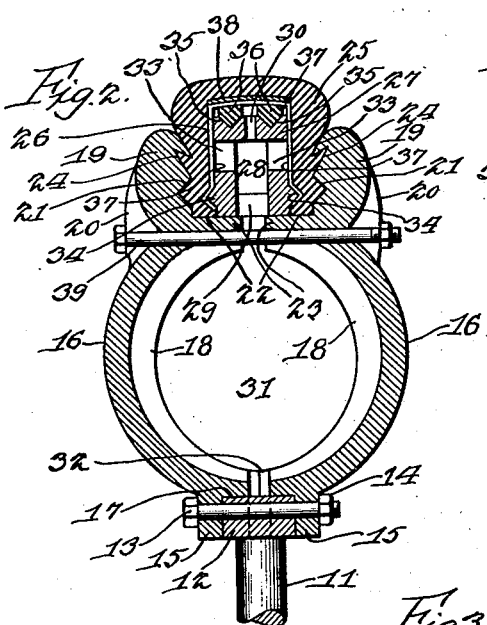
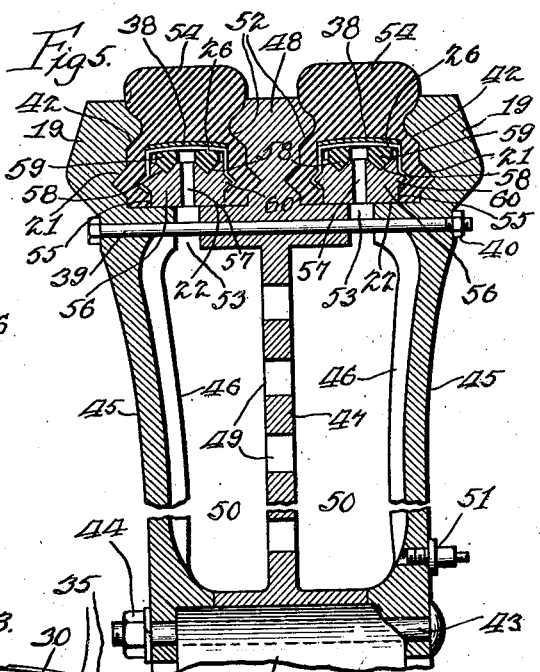
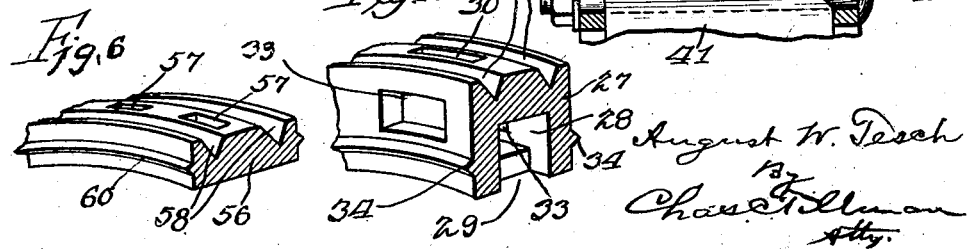

UNITED STATES PATENT OFFICE.

AUGUST W. TESCH, OF LANSING, ILLINOIS.

RESILIENT WHEEL.

1,352,769.

Specification of Letters Patent. Patented Sept. 14, 1920.

Application filed February 2, 1920. Serial No. 355,692.

*To all whom it may concern:*

Be it known that I, AUGUST W. TESCH, a citizen of the United States, residing at Lansing, in the county of Cook and State of Illinois, have invented certain new and useful Improvements in a Resilient Wheel, of which the following is a specification.

This invention relates to improvements in vehicle wheels, of a type which is more particularly intended for use on automobiles and auto-trucks, but which may be employed on other kinds of vehicles, and it consists in certain peculiarities of the construction, novel arrangement and operation of the various parts thereof as will be hereinafter more fully set forth and specifically claimed.

The principal object of the invention is to furnish a wheel of the above named general character, which shall be so constructed as to furnish a yielding or resilient tread portion thereof similar to that afforded by pneumatic tires employing inner tubes, but in which said tubes are dispensed with, yet a combined pneumatic and mechanically produced resiliency or cushioning effect will be afforded.

Another object of the invention is to provide a wheel of such construction and arrangement of its parts, that they can be readily assembled for use and easily detached for repairs or replacement of new parts. Still another object is to furnish a wheel which shall be simple and inexpensive in construction, strong, durable, efficient in operation and practically puncture proof.

Other objects and advantages of the invention will be disclosed in the following description and explanation.

In the accompanying drawing, which serves to illustrate an embodiment of the invention—

Figure 1 is a view in side elevation of a wheel constructed according to one form of the invention.

Fig. 2 is an enlarged cross-sectional view of the periphery of the wheel and its tire taken on line 2—2 of Fig. 1 looking in the direction indicated by the arrows.

Fig. 3 is a detached perspective view of a portion of the core used in connection with the rubber or resilient tread band or tire of the construction shown in Figs. 1 and 2.

Fig. 4 is a side or face view of a wheel embodying another form of the invention.

Fig. 5 is an enlarged sectional view taken on line 5—5 of Fig. 4 looking in the direction indicated by the arrows, and Fig. 6 is a detached perspective view of one of the cores used in the resilient or rubber tires of said construction.

Like numerals of reference refer to corresponding parts throughout the different views of the drawing.

Referring now more particularly to Figs. 1 to 3 inclusive of the drawing, the reference numeral 10 designates the hub of the wheel from which radiate a series of spokes 11 of the ordinary construction and well known arrangement. Mounted and secured on the outer end of the spokes 11 is a felly 12 to the sides of which are secured by means of bolts 13 and nuts 14 thereon the inner peripheral flanges 15 of circular or annular body members 16 of the tire. As shown in Fig. 2 the members 16 are counter-parts of one another and are substantially semi-circular in cross-section.

By reference to Fig. 2, it will be seen that the flange 15 on each of the members 16 is located some distance outwardly from the meeting surfaces of said members at their inner periphery so as to afford an angular recess 17 for the reception of the correspondingly shaped felly 12 which felly as well as the flanges 15 are provided at suitable points with transversely disposed and registering openings for the reception of the securing bolts therefor. At suitable distances apart each of the members 16 is provided on its inner surface with a semi-circular strengthening rib 18. At its outer periphery each of the members 16 is provided with an outwardly and circumferentially extended jaw 19 which are braced at suitable intervals by radial ribs 20 by preference cast or integrally formed with the members 16 and jaws 19.

Each of the jaws 19 has in its inner surface a circumferentially extended groove 21 which is located a suitable distance outwardly from the floor or outer surface 22 of the inwardly extended portion 23 of the member 16 on which said jaw is located, and said grooves are by preference substantially V-shaped as shown. Each of the jaws 19 is provided in its inner surface between the outer portion of the groove 21 therein with an acute angled recess 24 which extends outwardly in said jaws and circumferentially therewith as will be understood by reference to Fig. 2 of the drawing.

By this arrangement it will be understood that a circumferential recess having a flat surfaced floor 22 will be provided between the inner and irregular surfaces of the jaws 19 for the reception of a resilient tread or tire band which is designated as a whole by the numeral 25 and is by preference made of rubber. This tread piece or tire band is provided in its inner portion with a circumferentially extended channel 26 which is by preference rectangular in cross-section as shown, the said channel being open at the inner periphery of the piece or tire band 25 for the reception of an annular core, designated as a whole by the numeral 27, the inner surface of which core rests on the floor 22 of the recess formed by the clamping jaws 19 of the body members of the tire. The annular core 27 is made of strong material, such as metal, and has extended circumferentially therethrough a channel 28 from which lead at proper spaces apart in the inner and outer surfaces thereof openings 29 and 30 respectively for the passage of air from the chamber 31 formed by the body members 16 to which air under pressure may be supplied through a suitable opening 32 located in the inner periphery of said members between a pair of spokes 11 of the wheel. The core 27 is also provided in its sides with openings 33 for the passage of air laterally from the main channel 28 of said core.

Each side of the core is provided near its inner periphery with a circumferentially disposed and laterally extended angular rib 34 which is located approximately opposite the annular grooves 21 in the jaws between which said core and the tread piece or tire band 29 is located. The outer surface of the core 27 is provided with a pair of circumferentially disposed grooves 35 which are usually angular in cross-section as shown and are for the reception of strips 36 or bands of rubber as shown in Fig. 2 of the drawing.

Located on the outer surfaces of the circular strips 36 and between the same and the outer wall of the recess 26 in the tread piece or tire band 25 is a sheet or piece 37 of rubber or fiber, which it will be observed in Fig. 2 overhangs the ribs 34 of the core and is interposed between the said tread piece or tire band for the purpose of preventing the escape of compressed air, yet, for permitting air to pass between the side walls of the core and said sheet when the tire band is compressed.

By the above described construction and arrangement of the parts, it is apparent that the side walls of the resilient tire band 25 will be forced into the recesses 21 and 24 of the jaws 19 by reason of the angular shaped ribs 34 and that thus the tire band will be securely held in place. Interposed between the outer wall of the recess 26 in the tire band 25 and the sheet or piece 37 is a split metal band 38 which may have its ends overlapping one another, and is employed to prevent puncture of the sheet 37 should a spike or the like be forced through the tread portion of the tire band. At the juncture of the jaws 19 with their respective members 16 said parts are connected together by means of securing bolts 39 and nuts 40, which bolts are extended through suitable openings in said parts.

In Figs. 4 to 6 inclusive of the drawing is shown another form of the invention, which form or construction is more particularly adapted for use on auto trucks or very heavy vehicles, while the construction shown in Figs. 1 to 3 inclusive and above described is more especially intended for use on light vehicles or touring cars, yet the same general principles are maintained in each construction, as will be readily understood from the following description.

Instead of employing spokes as in the other described construction, the hub 41 of the wheel is provided at one of its ends with a circular disk having at its outer periphery a circumferentially extended jaw 19 of substantially the same construction as the jaws of the other form except that the acute angled recess 24 in the first described jaw is omitted and an obtuse angled recess 42 is employed instead thereof.

On the other end of the hub 41 is secured thereto by means of bolts 43 and nuts 44 another disk 45 which like the disk 45 on the other end of the hub is provided with a jaw 19 of similar construction on its inner surface. Each of the disks 45 is by preference provided on its inner surface with radially extended strengthening ribs 46 located at suitable distances apart.

Mounted on the hub between the disks 45 is another disk 47 which has at its periphery a double faced circumferential jaw 48 the faces of which are of the same construction as the inner faces of the jaws 19 on the outer disks. The disk 47 is provided with a number of transverse openings 49 for the passage of compressed air which may be supplied to one of the chambers 50 of the hollow body formed by the disk 45 through a valve 51 located in the outer disk near its juncture with the hub.

By the foregoing arrangement of the disks 45 and 47 it is apparent that a pair of circumferentially extended recesses designated as a whole by the numeral 52 will be provided and that each of said recesses will have communication through openings 53 in the floors 22 of the recesses 52 with the chambers of the hollow body. Located in each of the recesses 52 is a resilient piece or rubber tire band designated as a whole by the numeral 54 each of which has in its inner periphery a rectangular recess 55 for the reception of a circumferentially disposed core designated as a whole by the numeral 56. Each of the cores 56 is provided with a series of openings 57 having communication through the openings 53 with the chambers of the body and each of said cores has on its outer surface a pair of parallel grooves 58 in which are located rubber strips 59 similar to the strips 36 of the other construction and for a like purpose. Each of the sides of each of the cores 56 is provided with a circumferentially extended rib 60 which is located opposite the angular shaped ribs 21 on the tire bands 54. In the construction now under consideration a flexible sheet of fiber or rubber 26 is interposed between each of the cores 56 and the walls of the recess in which it is located and besides a steel or metal band 38 is interposed between the outer wall of the recess of each of the tires 54 and the sheet 26 located therein and for the same purpose as above described.

It is manifest that the intervening disk 47 and its head or jaw 48 can be omitted and that a hub shorter in length than that shown in Fig. 5 can be employed by which arrangement it will be understood that one recess 42 only will be provided, in which case a single tire band or resilient piece 54 can be located therein and equipped with a core 56 of the construction and in the manner as above set forth.

Having thus fully described my invention, what I claim as new and desire to secure by Letters Patent is—

1. In a wheel of the class described, the combination with a hub, of a circular hollow body concentrically mounted around the same and supported thereby and having an inlet opening, spaced apart circumferentially extended jaws at the outer periphery of said body, each of said jaws having its inner face circumferentially grooved and provided with an inwardly extended floor, a resilient channeled tread piece located circumferentially in the space between said jaws and an orificed core located circumferentially in the channel of the tread piece.

2. In a wheel of the class described, the combination with a hub, of a circular hollow body concentrically mounted around the same and supported thereby and having an inlet opening, spaced apart circumferentially extended jaws at the outer periphery of said body, each of said jaws having its inner face circumferentially grooved and provided with an inwardly extended floor, a resilient channeled tread piece located circumferentially in the space between said jaws, an orificed core located circumferentially in the channel of the tread piece and having on each of its side walls a circumferentially extended rib, and a flexible strip interposed between the walls of the core and the walls of the channel in the tread piece.

3. In a wheel of the class described, the combination with a hub, of a circular hollow body concentrically mounted around the same and supported thereby and having an inlet opening, spaced apart circumferentially extended jaws at the outer periphery of said body, each of said jaws having its inner face circumferentially grooved and provided with an inwardly extended floor, a resilient channeled tread piece located circumferentially in the space between said jaws, an orificed core located circumferentially in the channel of the tread piece and having on each of its side walls a circumferentially extended rib, a flexible strip interposed between the walls of the core and the walls of the channel in the tread piece, and an expansible band located between the outer portion of said strip and the outer wall of the channel in the tread piece.

4. In a wheel of the class described, the combination with a hub, of a circular hollow body concentrically mounted around the same and supported thereby and having an inlet opening, spaced apart circumferentially extending jaws at the outer periphery of said body, each of said jaws having its inner face circumferentially grooved and provided with an inwardly extended floor, a resilient channeled tread piece located circumferentially in the space between said jaws, an orificed core located circumferentially in the channel of the tread piece and having in its outer periphery a pair of parallel grooves, a resilient strip located in each of said grooves, and a flexible strip interposed between the walls of the core and the walls of the channel in the tread piece, as well as between said resilient strips and the outer wall of said channel.

5. In a wheel of the class described, the combination with a hub, of a circular hollow body concentrically mounted around the same and supported thereby and having an inlet opening, spaced apart circumferentially extended jaws at the outer periphery of said body, each of said jaws having its inner face circumferentially grooved and provided with an inwardly extended floor, a resilient channeled tread piece located circumferentially in the space between said jaws, an orificed core located circumferentially in the channel of the tread piece and having in its outer periphery a pair of parallel grooves and on each of its side walls a circumferentially extended rib, a resilient strip located in each of said grooves, a flexible strip interposed between the walls of the core and the walls of the channel in the tread piece as well as between said resilient strips and the outer wall of said channel and an expansible band located between the outer portion of said strip and the outer wall of the channel in the tread piece.

6. In a wheel of the class described, the combination with a hub, of a circular disk mounted on and around the same near each end thereof, one of said disks having an inlet opening, another disk interposed between the first named disks, a circumferentially extended jaw at the outer periphery of each of the outer disks, a circumferentially extended double faced jaw at the outer periphery of the intermediate disk, each of the outer jaws having its inner face circumferentially grooved and provided with an inwardly extended floor, each of the faces of the jaw on the intermediate disk being circumferentially grooved and provided with an outwardly extended floor, a resilient channeled tread piece located in each of the spaces between said jaws, an orificed core located circumferentially in the channel of each tread piece and having in its outer periphery a pair of parallel grooves and on each of its side walls a circumferentially extended rib, a resilient strip located in each of the grooves of each of said cores, a flexible sheet or strip interposed between the walls of the core and the walls of the channel in each of the tread pieces as well as between said resilient strips and the outer wall of said channel and an expansible band located between the outer portion of said strip and the outer wall of the channel in the tread piece.

AUGUST W. TESCH.